United States Patent [19]

Reinartz et al.

[11] 4,444,052
[45] Apr. 24, 1984

[54] COMPENSATING BRAKE FLUID RESERVOIR

[75] Inventors: Hans-Dieter Reinartz, Frankfurt am Main; Waldemar Vatter, Laubach; Peter Hinze, Frankfurt am Main, all of Fed. Rep. of Germany

[73] Assignee: ITT Industries, Inc., New York, N.Y.

[21] Appl. No.: 485,384

[22] Filed: Apr. 20, 1983

Related U.S. Application Data

[63] Continuation of Ser. No. 252,703, Apr. 9, 1981, abandoned.

[30] Foreign Application Priority Data

Apr. 29, 1980 [DE] Fed. Rep. of Germany ....... 3016434

[51] Int. Cl.³ ............................................. G01F 23/10
[52] U.S. Cl. ...................................... 73/308; 116/228; 340/59; 340/624; 200/61.2
[58] Field of Search ................. 116/228; 73/306, 307, 73/308; 340/623, 624, 59; 200/61.2

[56] References Cited

U.S. PATENT DOCUMENTS

| | | | |
|---|---|---|---|
| 2,613,294 | 10/1952 | McNea | 340/623 |
| 2,744,177 | 5/1956 | Barber | 116/228 X |
| 3,611,285 | 10/1971 | Eggstein | 340/624 |
| 3,947,813 | 3/1976 | Uemura | 340/624 |

FOREIGN PATENT DOCUMENTS 2930242  3/1981  Fed. Rep. of Germany ...... 116/228

Primary Examiner—Gerald Goldberg
Assistant Examiner—John E. Chapman, Jr.
Attorney, Agent, or Firm—James B. Raden; Marvin M. Chaban

[57] ABSTRACT

Compensating brake fluid reservoirs with a brake fluid alarm device are required for master cylinders of hydraulic brake systems in automotive vehicles. A float chamber, which is disposed in a compensating reservoir and surrounds a float, is defined by a tubular body suspended from an upper end of the reservoir and a bottom element. After insertion of both parts into the reservoir the bottom element cooperates with the lower end of the tubular body such that the float chamber is closed at least to such an extent that the inflow and outflow of the fluid therefrom is inhibited in order to achieve a damping effect. This enables a quick immersion of both parts into the filled reservoir without brake fluid leaking from the reservoir.

22 Claims, 3 Drawing Figures

COMPENSATING BRAKE FLUID RESERVOIR

CROSS REFERENCE TO RELATED APPLICATION

This application is a continuation of application Ser. No. 252,703, filed Apr. 9, 1981, now abandoned.

BACKGROUND OF THE INVENTION

The present invention relates to a compensating brake fluid reservoir, in particular for a vehicular hydraulic brake system, comprising a brake fluid level alarm device including a float chamber surrounding a float. The float chamber is defined by a bottom element and a tubular body, the tubular body being suspended from a threaded upper open end of the reservoir and the end of the tubular body immersed in the brake fluid having an opening.

In a known compensating reservoir of this type, for instance, as disclosed in German Patent DE-OS No. 1,630,037, the tubular body centers the float in order to avoid a tilting of the float within its guideway. The reservoir is attached to a master brake cylinder by means of a stud bolt arranged in the outlet socket, by means of a bottom element, and by means of a plate-type disc having passages. In this arrangement, the position of the bottom element serving to center the tubular body must be concentric with respect of the thread of the upper open end of the reservoir in order to ensure that, when screwing the tubular body in, the lower end thereof will embrace the bottom element without play. When screwing in the tubular body, it may happen that the tubular body will not enclose the bottom element, but rather rest on the bottom element and be moved out of place in such a manner that the float will be jammed in the tubular body. Thus, the fluid level indicating device will no longer be able to operate. The way of attaching the compensating reservoir at a master brake cylinder is complicated and expensive and does not permit universal application.

Further, from the German Patent DE-OS No. 2,720,596 it is known that the tubular body arranged in the compensating reservoir also performs the function of a damping chamber. In this arrangement, a primary function of the tubular body is to prevent the float from dancing up and down in case of vibrations acting on the compensating reservoir and, thus, causing faulty alarms. Another function of the tubular body is to center the float in its direction of motion in order to prevent the float from being jammed in its guideway.

SUMMARY OF THE INVENTION

It is an object of the present invention to provide a compensating reservoir of the type referred to hereinabove enabling a simplified way of attachment and assembly of the float chamber, while a fast immersion of the components which form the float chamber into the reservoir shall be possible without brake fluid flowing out of the reservoir during this action.

Another object of the present invention is to provide a compensating reservoir which may be equipped with a brake fluid alarm device at a later date without having to effect any changes at the reservoir.

A feature of the present invention is the provision of a compensating reservoir having a brake fluid level alarm device for a vehicular hydraulic brake system comprising a brake fluid reservoir having a threaded upper open end; and a float chamber disposed in the reservoir surrounding a float. The float chamber is defined by a tubular body suspended from the open end having a first opening at an end thereof remote from the open end and a bottom element separate from the tubular body, which after installation in the reservoir, touches the tubular body so as to close the chamber at least to the extent that inflow and outflow of brake fluid in the chamber is partially obstructed to provide a damping effect on the float.

Thanks to the invention construction, the float chamber will not be formed until after the insertion of the tubular body and the bottom element into the reservoir. In case of vibrations acting on the reservoir the float chamber will dampen the motion of the float, while centering the latter so as to prevent it from becoming jammed in its guideway. The bottom element and the tubular body are simple shaped parts made from plastic and quickly installable in the compensating reservoir without any complicated assembling operations.

The throttle bore arranged in the bottom element permanently provides for an approximately even level of filling of the reservoir and the float chamber without impairing the operation and function of the float chamber.

A further embodiment of the reservoir includes at least one opening in the tubular supporting device near the bottom element which permits a fast inflow of the brake fluid and is closed by the insertion of the tubular body. Thus, brake fluid will be prevented from overflowing from the reservoir during the immersion of the supporting device into the filled reservoir.

The supporting device for the bottom element may be provided by at least one connecting element suspended from the upper open end of the reservoir and having an opening as large as possible to provide a very fast inflow of the brake fluid upon the immersion thereof into the filled reservoir. However, the connecting element must be dimensioned so as to ensure that the supporting device will absorb the tension which will result when tightening the tubular body with respect to the bottom element, and that an even sealing action also is provided between the supporting device and the tubular body.

It will be advantageous for the end of the connecting element which serves for attachment to the upper open end of the reservoir to be connected with an annular collar. The collar will provide an even load distribution against the open end which will permit free suspension of the bottom element in the reservoir.

In a further embodiment for the float chamber, the supporting device of the bottom element is formed at the lower end of the tubular body and, due to the higher specific weight of the bottom element with respect to the brake fluid, the bottom element, which is insertible into the tubular body, rests on the supporting device and may be moved within the tubular body. Upon the immersion of the float chamber into the filled reservoir, the bottom element will be lifted by the fluid entering the tubular body and will move within the tubular body. In this arrangement, the fluid will continue to flow into the tubular body until the fluid levels in the tubular body and in the reservoir are approximately the same. Thereby, the fluid will be prevented from being spilled out of the inlet socket of the reservoir. The favorable construction of the tubular body permits its manufacture from just one injection-moulded plastic part. The bottom element is a simple part formed, e.g. by being punched out from sheet metal. The bottom element may be treated with a coating which is corrosion-resistant to brake fluid and water. Due to the higher specific weight of the bottom element with respect to the brake fluid, after the immersion of the tubular body into the reservoir, the bottom element will rest on the supporting device and will not lift off of the supporting device even upon vibrations acting on the reservoir during driving.

It will be advantageous for the bottom element, which may be moved within the tubular body, to be limited in the upward axial direction, by the position of the float. Thereby, upon the immersion of the tubular body into the reservoir, the bottom element will not tilt in the opening of the supporting device and will thus safely close the float chamber after the inflow of the fluid.

In case of the bottom element being a circular disc, it may, e.g. be punched out from sheet metal strip which is cheap and easy.

It will also be advantageous for the bottom element to be a ball, since such an element finds general use in ball-type check valves where it has proved itself.

If a ball valve is used, it will be advantageous to provide a throttle bore in the supporting device, since the throttle bore may be formed during the injection moulding operation of the tubular body and the supporting device.

It will be advantageous for the supporting device to have the shape of a funnel, the taper of the funnel pointing in the direction of the bottom of the reservoir. Thereby, after the insertion of the tubular body into the reservoir, the ball will always roll into the opening of the funnel and adopt a stable position.

BRIEF DESCRIPTION OF THE DRAWINGS

Above-mentioned and other features and objects of this invention will become more apparent by reference to the following description taken in conjunction with the accompanying drawing, in which.

DESCRIPTION OF THE PREFERRED EMBODIMENT

Figure 1:
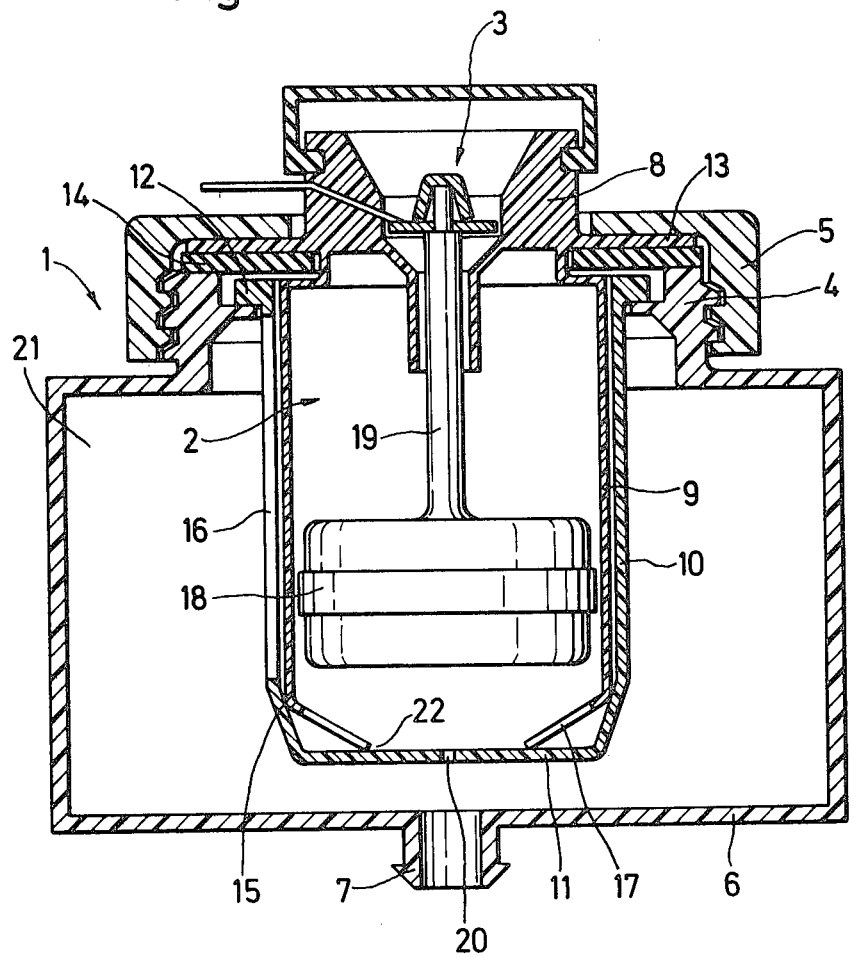
FIG. 1 is a longitudinal cross-sectional view of a compensating reservoir with a first embodiment of a damping chamber in accordance with the principles of the present invention.

Referring to FIG. 1, a compensating reservoir is illustrated which essentially includes a reservoir 1, a float chamber 2 with an integrated brake fluid alarm device 3, and a filler cap 5 holding float chamber 2 at the externally threaded upper open end 4. The outlet 7 arranged at the bottom 6 of reservoir 1 connects a master brake cylinder (not shown) with reservoir 1.

Float chamber 2 is formed by the tubular body 9 and the supporting device 10 with its bottom element 11, tubular body 9 being formed in one piece together with the casing 8 of brake fluid alarm device 3. Tubular body 9 and supporting device 10 enclosing tubular body 9 are suspended in reservoir 1 and rest with their annular collars 12 and 13 on open end 4. A seal 14 is provided between the annular collar 13 and open end 4. Filler cap 5 presses tubular body 9 against the sealing surface 15 of supporting device 10, thus, preventing the fluid from flowing into float chamber 2 through the openings 16 provided in supporting device 10. Below sealing surface 15, resilient supporting elements 17 having openings 22 therein are arranged on tubular body 9. Supporting elements 17 extend towards the center of and abut bottom element 11 where they support themselves. Supporting elements 17 serve to reinforce the seal between sealing surface 15 and tubular body 9.

Within float chamber 2, a float 18 is arranged which, at its top surface is connected with a connecting rod 19 directed towards open end 4. When float 18 sinks below the minimum fluid level, connecting rod 19 will release a contact in brake fluid alarm device 3.

In bottom element 11, a throttle bore 20 is provided which connects float chamber 2 and reservoir chamber 21 to compensate the fluid levels of these two chambers.

The insertion of float chamber 2 into reservoir 1 will be explained in more detail in the following. Brake fluid will be supplied to reservoir 1 after or before the installation of supporting device 10 with its bottom element 11. In doing so, the fluid may flow through opening 16 of supporting device 10 into reservoir chamber 21 or into supporting device 10. Then casing 8 with its tubular body 9 and brake fluid alarm device 3 will be inserted into reservoir 1. In doing so, the fluid will flow, unhindered, through openings 22 and into tubular body 9. Upon screwing on the filler cap 5, tubular body 9 will press against sealing surface 15 of supporting device 10. Thus, float chamber 2 is closed except for throttle bore 20.

Figure 2:
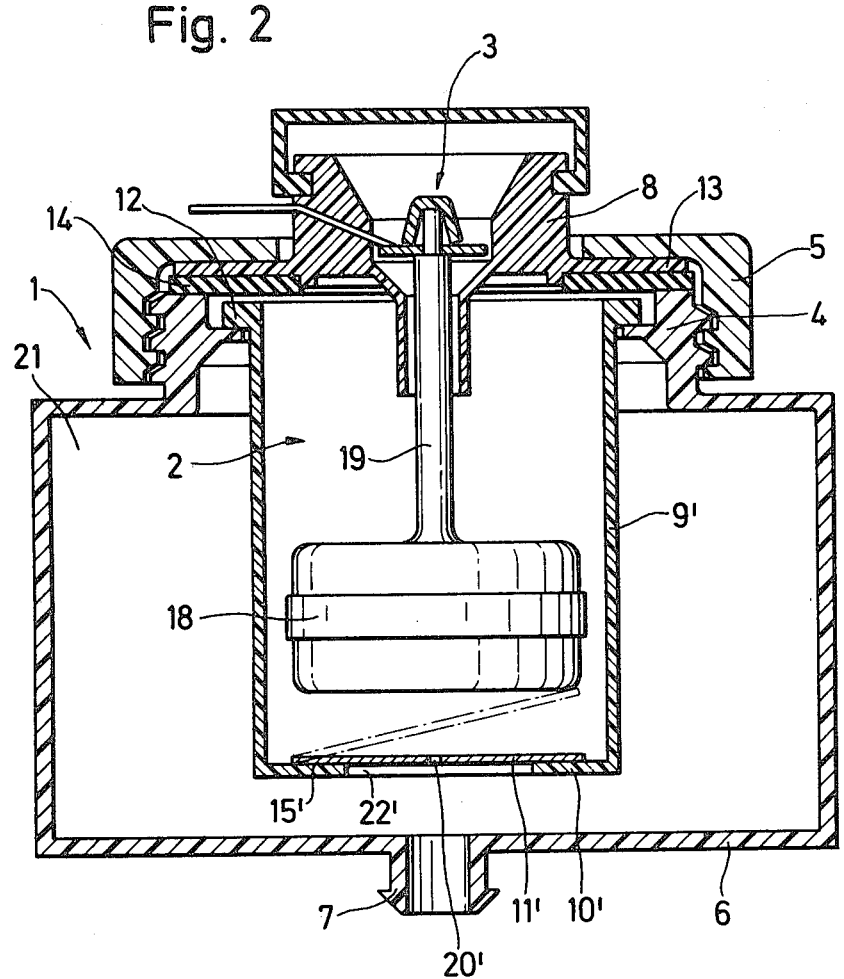
FIG. 2 is a longitudinal cross-sectional view of a compensating reservoir with a second embodiment of a damping chamber in accordance with the principles of the present invention.

Float chamber 2 illustrated in FIG. 2 differs from float chamber 2 illustrated in FIG. 1 in that the tubular body 9' and the supporting device 10' are formed in one piece.

The bottom element 11' is formed by a circular disc and will sealingly rest on sealing surface 15' of supporting device 10' after its insertion into tubular body 9' and will close the opening 22' provided in supporting device 10' except for the throttle bore 20'. In order to achieve the desired damping effect the two chambers 2 and 21 are connected by the throttle bore 20' provided in bottom element 11'. Tubular body 9' with its supporting device 10' may also be formed in one piece together with casing 8 of brake fluid alarm device 3. Then, bottom element 11' will be inserted into tubular body 9' via bore 22' of the elastically ductible supporting device 10'. Upon insertion of tubular body 9' into the reservoir 1, bottom element 11' will lift off of supporting device 10' and let the brake fluid freely enter float chamber 2 via bore 22'.

Figure 3:
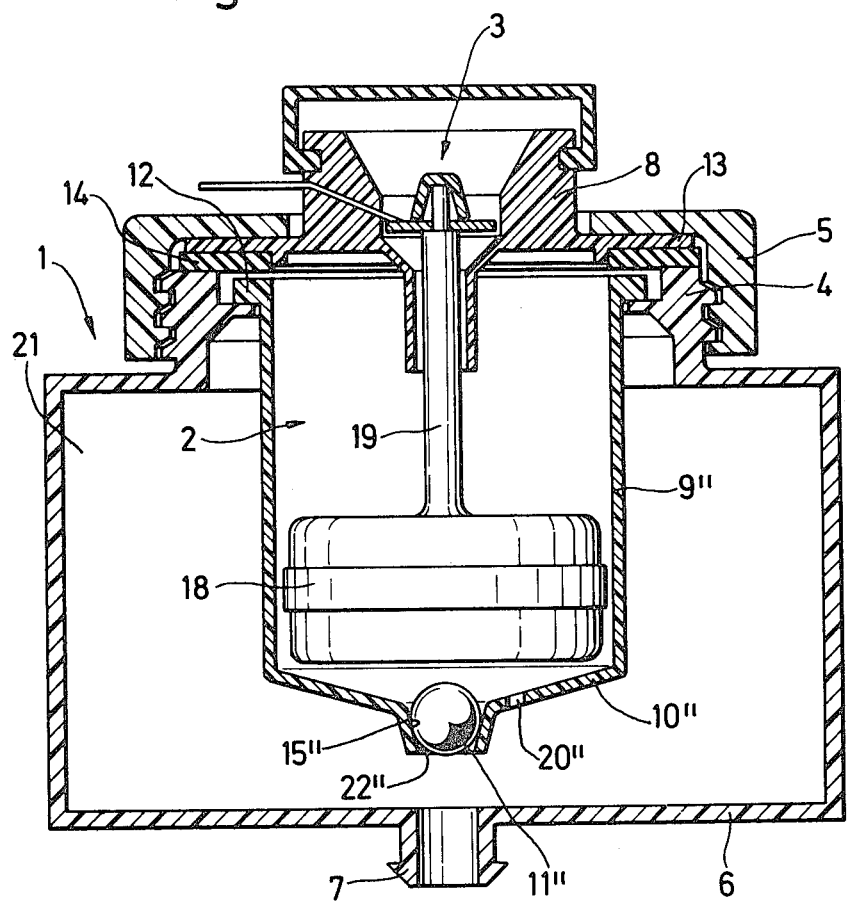
FIG. 3 is a longitudinal cross-sectional view of a compensating reservoir with a third embodiment of a damping chamber in accordance with the principles of the present invention.

In FIG. 3, a float chamber 2 is illustrated which differs from float chamber 2 of FIG. 2 in that bottom element 11" is a ball and in that, via the sealing surface 15", bottom element 11" closes an opening 22" provided in the funnel-shaped supporting device 10". In supporting device 10", a throttle bore 20" is provided.

While we have described above the principles of our invention in connection with the above-mentioned specific apparatus it is to be clearly understood that this description is made only by way of example and not as a limitation to the scope of our invention as set forth in the objects thereof and in the accompanying claims.

We claim:

1. A compensating reservoir having a brake fluid level alarm device for a vehicular hydraulic brake system comprising:

a brake fluid reservoir having an upper open end; and
a float chamber disposed in said reservoir surrounding a float, said chamber being defined by a tubular body suspended from said open end and a bottom element distinct from said tubular body, which after installation in said reservoir, cooperates with a supporting device disposed in contact with said tubular body so as to substantially close said chamber at least to the extent that during operation inflow and outflow of brake fluid in said chamber is restricted to provide a damping effect on said float;
said bottom element being supported by said supporting device, said supporting device having at least one opening to permit unrestricted flow of said brake fluid therethrough and into said chamber upon insertion of at least said supporting device into said reservoir to prevent fluid spill from said reservoir.

2. A reservoir according to claim 1, wherein
said bottom element includes a throttle bore therein to provide said damping effect.

3. A reservoir according to claim 1, wherein
said supporting device is supported from said open end, and said tubular body is inserted in said supporting device and comes in contact therewith adjacent said at least one opening of said supporting device to close said at least one opening of said supporting device.

4. A reservoir according to claim 3, wherein
each of said supporting device and said tubular body have a collar on an end thereof adjacent said open end for attachment to said open end.

5. A reservoir according to claim 4, wherein
said tubular body includes resilient supporting elements about said opening thereof bearing against said bottom element, said tubular body abutting an inside wall of said supporting device to close said at least one opening of said supporting device.

6. A reservoir according to claim 3, wherein
said tubular body includes resilient supporting elements about said opening thereof bearing against said bottom element, said tubular body abutting an inside wall of said supporting device to close said at least one opening of said supporting device.

7. A reservoir according to claim 1, wherein
said supporting device is connected to an end of said tubular body remote from said open end said bottom element having a specific weight greater than that of said brake fluid so that said bottom element rests on said supporting device to close said at least one opening thereof, said bottom element being capable of being moved axially within said chamber when said supporting device is inserted into said reservoir.

8. A reservoir according to claim 7, wherein
said bottom element is a circular disc.

9. A reservoir according to claim 7, wherein
said bottom element is limited in its axial movement into said chamber by said float.

10. A reservoir according to claim 9, wherein
said bottom element is a circular disc.

11. A reservoir according to claim 9, wherein
said tubular body has a collar on an end thereof adjacent said open end for attachment to said open end.

12. A reservoir according to claim 11, wherein
said bottom element is a circular disc.

13. A reservoir according to claim 7, wherein
said tubular body has a collar on an end thereof adjacent said open end for attachment to said open end.

14. A reservoir according to claim 3, wherein
said bottom element is a circular disc.

15. A reservoir according to claim 1, wherein
said bottom element is supported by said supporting device connected to an end of said tubular body remote from said open end, said supporting device having said at least one opening remote from said tubular body to permit said unrestricted flow of said brake fluid therethrough, said bottom element having a specific weight greater than that of said brake fluid so that said bottom element closes said at least one opening, said bottom element being capable of being moved axially within said chamber when said supporting device is inserted into said reservoir.

16. A reservoir according to claim 15, wherein
said bottom element is limited in its axial movement within said chamber by said float.

17. A reservoir according to claim 16, wherein
said tubular body has a collar on an end thereof adjacent said open end for attachment to said open end.

18. A reservoir according to claim 15, wherein
said tubular body has a collar on an end thereof adjacent said open end for attachment to said open end.

19. A reservoir according to claim 15, wherein
said supporting device includes a throttle bore therein to provide said damping effect.

20. A reservoir according to claim 19, wherein
said supporting device includes a funnel shaped portion containing said at least one opening, the taper of said funnel shaped portion pointing away from said float chamber to receive said bottom element.

21. A reservoir according to claim 15, wherein
said supporting device includes a funnel shaped portion containing said at least one opening, the taper of said funnel shaped portion pointing away from said float chamber to receive said bottom element.

22. A reservoir according to claims 15, 16, 17, 18, 19, 20, or 21, wherein
said bottom element is a ball.

* * * * *